(12) United States Patent
Ong

(10) Patent No.: US 12,143,939 B2
(45) Date of Patent: *Nov. 12, 2024

(54) METHODS AND SYSTEMS FOR WIRELESS COMMUNICATION

(71) Applicant: Comcast Cable Communications, LLC, Philadelphia, PA (US)

(72) Inventor: Ivan Ong, Malvern, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/094,180

(22) Filed: Jan. 6, 2023

(65) Prior Publication Data
US 2023/0144943 A1    May 11, 2023

Related U.S. Application Data

(63) Continuation of application No. 17/130,748, filed on Dec. 22, 2020, now Pat. No. 11,576,130, which is a continuation of application No. 16/388,611, filed on Apr. 18, 2019, now Pat. No. 10,917,857.

(51) Int. Cl.
*H04W 52/24* (2009.01)
*H04B 17/309* (2015.01)
*H04W 52/38* (2009.01)
*H04W 52/50* (2009.01)
*H04W 72/542* (2023.01)

(52) U.S. Cl.
CPC ........ *H04W 52/241* (2013.01); *H04B 17/309* (2015.01); *H04W 52/245* (2013.01); *H04W 52/386* (2013.01); *H04W 52/50* (2013.01); *H04W 72/542* (2023.01)

(58) Field of Classification Search
CPC .............. H04B 17/309; H04W 52/143; H04W 52/241; H04W 52/245; H04W 52/247; H04W 52/283; H04W 52/343; H04W 52/386; H04W 52/50; H04W 72/542; Y02D 30/70
USPC ........................................................ 455/522
See application file for complete search history.

(56) References Cited

U.S. PATENT DOCUMENTS

| | | | |
|---|---|---|---|
| 7,652,982 B1 | 1/2010 | Kovummal | |
| 9,781,684 B2 * | 10/2017 | Schwent | ............ H04W 52/241 |
| 10,110,396 B2 | 10/2018 | Lee | |
| 10,917,857 B2 | 2/2021 | Ong | |
| 10,945,161 B2 * | 3/2021 | Syed | ...................... H04W 16/14 |
| 11,576,130 B2 * | 2/2023 | Ong | ...................... H04B 17/309 |
| 2005/0058151 A1 * | 3/2005 | Yeh | ........................ H04W 52/46 370/445 |
| 2006/0084400 A1 | 4/2006 | Priotti et al. | |
| 2007/0010245 A1 * | 1/2007 | Levitan | .................. G06Q 50/32 455/411 |
| 2007/0223403 A1 * | 9/2007 | Furuskar | ............... H04W 52/24 370/278 |
| 2008/0056177 A1 * | 3/2008 | Mori | ..................... H04W 52/04 370/318 |
| 2008/0080436 A1 * | 4/2008 | Sandhu | ............... H04W 52/241 370/328 |

(Continued)

*Primary Examiner* — Tan H Trinh
(74) *Attorney, Agent, or Firm* — Ballard Spahr LLP

(57) ABSTRACT

Methods and systems for wireless communication are described. A computing device may receive data via a network. The computing device may modify one or more settings associated with a network based on the data.

21 Claims, 7 Drawing Sheets

(56) References Cited

U.S. PATENT DOCUMENTS

| | | |
|---|---|---|
| 2008/0153423 A1* | 6/2008 | Armstrong ............ H04W 24/06 455/67.14 |
| 2010/0017200 A1 | 1/2010 | Oshikiri et al. |
| 2010/0260110 A1* | 10/2010 | Kubler .................. H04L 65/104 370/328 |
| 2013/0273948 A1 | 10/2013 | Tel-Or |
| 2013/0332150 A1 | 12/2013 | Oshikiri et al. |
| 2014/0101758 A1 | 4/2014 | Udin et al. |
| 2014/0286219 A1* | 9/2014 | Siomina ................ H04W 24/10 370/311 |
| 2015/0057014 A1* | 2/2015 | Kadous ................. H04W 4/023 455/456.1 |
| 2015/0071368 A1 | 3/2015 | Lau et al. |
| 2015/0098417 A1 | 4/2015 | Hughes |
| 2015/0245236 A1 | 8/2015 | Lu et al. |
| 2015/0304377 A1 | 10/2015 | Chitrakar et al. |
| 2015/0318945 A1 | 11/2015 | Abdelmonem et al. |
| 2016/0037531 A1 | 2/2016 | Lu et al. |
| 2016/0226732 A1 | 8/2016 | Kim et al. |
| 2016/0316501 A1 | 10/2016 | Roe et al. |
| 2017/0188314 A1* | 6/2017 | Mueck ................... H04W 24/02 |
| 2017/0212210 A1 | 7/2017 | Chen et al. |
| 2017/0249007 A1 | 8/2017 | Hardin et al. |
| 2017/0353516 A1 | 12/2017 | Gordon |
| 2018/0035363 A1 | 2/2018 | Gupta et al. |
| 2018/0103139 A1 | 4/2018 | Griffin |
| 2018/0103392 A1 | 4/2018 | Emmanuel et al. |
| 2018/0115618 A1* | 4/2018 | Park ........................ H04L 67/51 |
| 2018/0263067 A1* | 9/2018 | Stephens ............... H04W 12/63 |
| 2018/0352554 A1* | 12/2018 | Flynn ................. H04W 72/1215 |
| 2019/0200363 A1 | 6/2019 | Rajendran |
| 2019/0236203 A1 | 8/2019 | De Boer |
| 2019/0312974 A1 | 10/2019 | Soundar |
| 2020/0187222 A1* | 6/2020 | Rao ........................ H04L 5/0073 |
| 2020/0294401 A1* | 9/2020 | Kerecsen ............... G07C 5/008 |
| 2020/0366468 A1 | 11/2020 | Khandani |
| 2021/0105051 A1 | 4/2021 | Min et al. |
| 2022/0408370 A1* | 12/2022 | Wang ................. H04W 52/367 |

* cited by examiner

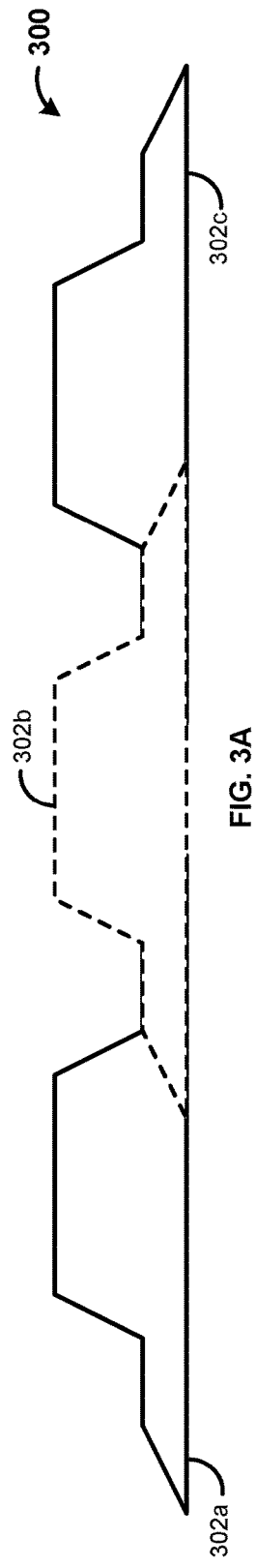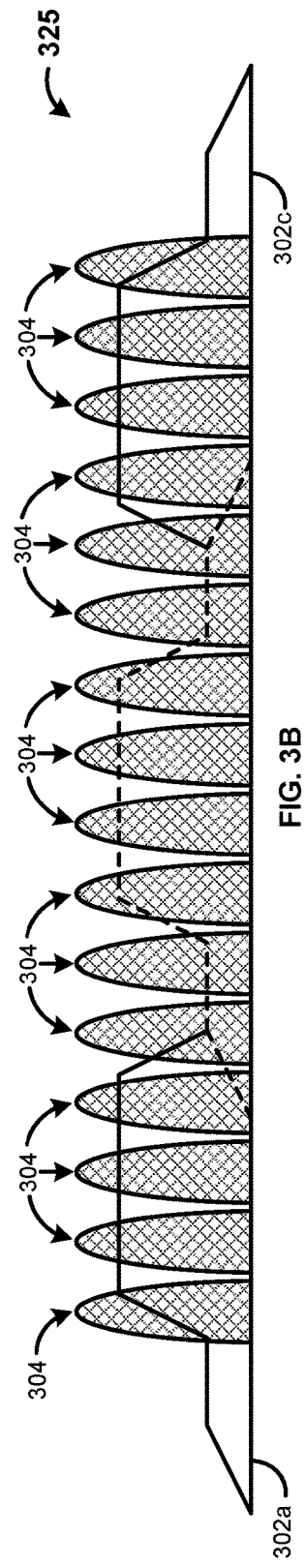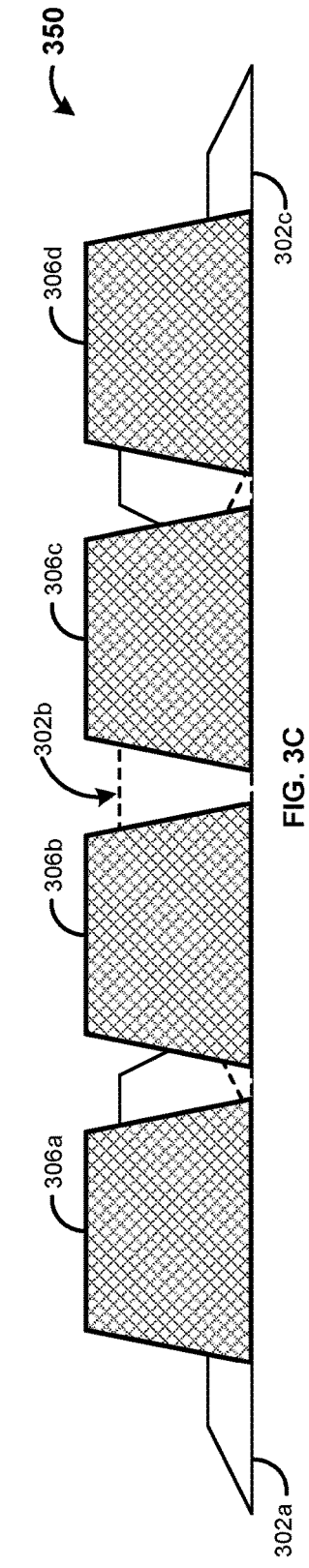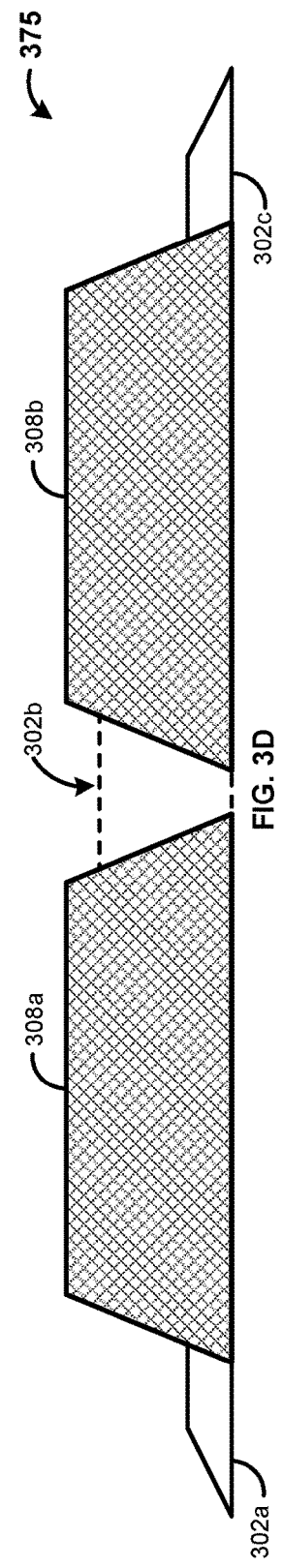

```
┌─────────────────────────────────────────────────────────────┐ 410
│  RECEIVING ONE OR MORE ATTRIBUTES OF A COMPUTING DEVICE     │
└─────────────────────────────────────────────────────────────┘
                              │
                              ▼
┌─────────────────────────────────────────────────────────────┐ 420
│  DETERMINE A TIME PERIOD FOR COMMUNICATING WITH THE COMPUTING│
│                           DEVICE                             │
└─────────────────────────────────────────────────────────────┘
                              │
                              ▼
┌─────────────────────────────────────────────────────────────┐ 430
│  RECEIVE DATA THAT INDICATES ONE OR MORE CONNECTION ATTRIBUTES│
└─────────────────────────────────────────────────────────────┘
                              │
                              ▼
┌─────────────────────────────────────────────────────────────┐ 440
│  DETERMINE A POWER LEVEL REDUCTION OF A WIRELESS NETWORK    │
└─────────────────────────────────────────────────────────────┘
```

```
┌─────────────────────────────────────────────────────────────┐
│  RECEIVING ONE OR MORE ATTRIBUTES OF A COMPUTING DEVICE     │ ─ 510
└─────────────────────────────────────────────────────────────┘
                              │
                              ▼
┌─────────────────────────────────────────────────────────────┐
│  DETERMINE A PLURALITY OF CHANNEL BANDS THAT FACILITATE     │ ─ 520
│         COMMUNICATION WITH THE COMPUTING DEVICE             │
└─────────────────────────────────────────────────────────────┘
                              │
                              ▼
┌─────────────────────────────────────────────────────────────┐
│  DETERMINE A CONCATENATED CHANNEL BAND COMPRISING THE       │ ─ 530
│              PLURALITY OF CHANNEL BANDS                     │
└─────────────────────────────────────────────────────────────┘
                              │
                              ▼
┌─────────────────────────────────────────────────────────────┐
│       RECEIVE DATA VIA THE CONCATENATED CHANNEL BAND        │ ─ 540
└─────────────────────────────────────────────────────────────┘
```

METHODS AND SYSTEMS FOR WIRELESS COMMUNICATION

CROSS-REFERENCE TO RELATED APPLICATIONS

This application is a continuation of, and claims priority to, U.S. patent application Ser. No. 17/130,748, filed on Dec. 22, 2020, which is a continuation of, and claims priority to, U.S. application Ser. No. 16/388,611, filed on Apr. 18, 2019 (now U.S. Pat. No. 10,917,857, issued on Feb. 9, 2021), the entire contents of each of which are hereby incorporated herein by reference in their entirety.

BACKGROUND

As more electronic devices utilize communication networks (e.g., wireless communication networks), the communication networks may become more congested with communication traffic. Further, multiple electronic devices may send electronic communications via the same communication channel, which may result in increased interference. For example, Wi-Fi typically operates in one or more bands (e.g., 2.4 GHz, 5 GHz, etc.), and electronic devices that utilize Wireless Personal Area Networks (WPANs), such as ZigBee, may also utilize the 2.4 GHz band. However, when two electronic devices communicate on the same band, interference may occur with the communications such that one device's communication may be over powered by the other device's communication. For example, electronic devices that utilize WPANs may be low powered devices, such as Internet of Things (IoT) devices, which have low powered communications. Thus, the communications from IoT devices may be overpowered by the communications from Wi-Fi devices when both the IoT devices and the Wi-Fi devices utilize the same wireless band.

SUMMARY

It is to be understood that both the following general description and the following detailed description are exemplary and explanatory only and are not restrictive. Methods and systems for wireless communication are described. A wireless device (e.g., an IoT device) may communicate with a network device (e.g., a gateway, a router, etc.) to pair the wireless device with the network device directly or via a wireless network. The wireless device may provide the network device with one or more characteristics of the wireless device to facilitate communication with the network device. The wireless device may communicate with the network device via a first wireless network. The network device may utilize the characteristics of the wireless device to determine a time period that the wireless device may communicate with the network device via the first wireless network. The network device may receive connection characteristics from the wireless device. The network device may receive the connection characteristics after the wireless device's location has changed. The network device may modify a power level of a second wireless network based on the connection characteristics after the wireless device's location has changed. The network device may reduce the power level of the second wireless network during the time period to improve the ability of the network device to receive communications from the wireless device. Further, the network device may concatenate one or more communication bands to improve the ability of the network device to receive communications from the wireless device. This summary is not intended to identify critical or essential features of the disclosure, but merely to summarize certain features and variations thereof. Other details and features will be described in the sections that follow.

BRIEF DESCRIPTION OF THE DRAWINGS

The accompanying drawings, which are incorporated in and constitute a part of this specification, show examples and together with the description, serve to explain the principles of the methods and systems:

FIGS. 3A-3D show example diagrams of wireless communication channels;

FIG. 4 shows a flowchart of an example method for wireless communication;

FIG. 5 shows a flowchart of an example method for wireless communication;

DETAILED DESCRIPTION

Figure 1:
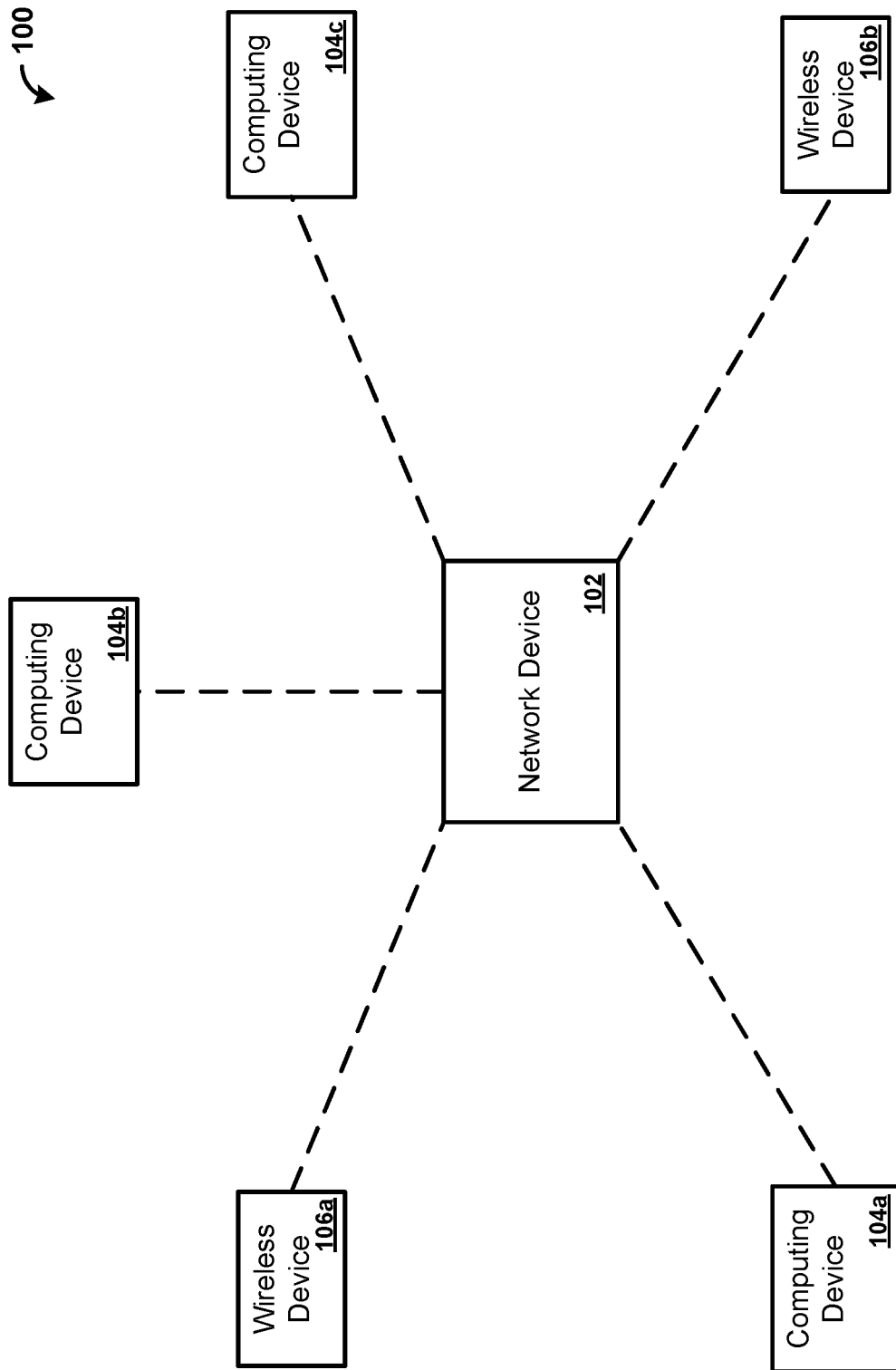
FIG. 1 shows an example system for wireless communication.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another configuration includes from the one particular value and/or to the other particular value. Similarly, when values are expressed as approximations, by use of the antecedent "about," it will be understood that the particular value forms another configuration. It will be further understood that the endpoints of each of the ranges are significant both in relation to the other endpoint, and independently of the other endpoint.

"Optional" or "optionally" means that the subsequently described event or circumstance may or may not occur, and that the description includes cases where said event or circumstance occurs and cases where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal configuration. "Such as" is not used in a restrictive sense, but for explanatory purposes.

It is understood that when combinations, subsets, interactions, groups, etc. of components are described that, while specific reference of each various individual and collective combinations and permutations of these may not be explicitly described, each is specifically contemplated and described herein. This applies to all parts of this application including, but not limited to, steps in described methods. Thus, if there are a variety of additional steps that may be performed it is understood that each of these additional steps may be performed with any specific configuration or combination of configurations of the described methods.

As will be appreciated by one skilled in the art, hardware, software, or a combination of software and hardware may be implemented. Furthermore, a computer program product on a computer-readable storage medium (e.g., non-transitory) having processor-executable instructions (e.g., computer software) embodied in the storage medium. Any suitable computer-readable storage medium may be utilized including hard disks, CD-ROMs, optical storage devices, magnetic storage devices, memresistors, Non-Volatile Random Access Memory (NVRAM), flash memory, or a combination thereof.

Throughout this application reference is made block diagrams and flowcharts. It will be understood that each block of the block diagrams and flowcharts, and combinations of blocks in the block diagrams and flowcharts, respectively, may be implemented by processor-executable instructions. These processor-executable instructions may be loaded onto a general purpose computer, special purpose computer, or other programmable data processing apparatus to produce a machine, such that the processor-executable instructions which execute on the computer or other programmable data processing apparatus create a device for implementing the functions specified in the flowchart block or blocks.

These processor-executable instructions may also be stored in a computer-readable memory that may direct a computer or other programmable data processing apparatus to function in a particular manner, such that the processor-executable instructions stored in the computer-readable memory produce an article of manufacture including processor-executable instructions for implementing the function specified in the flowchart block or blocks. The processor-executable instructions may also be loaded onto a computer or other programmable data processing apparatus to cause a series of operational steps to be performed on the computer or other programmable apparatus to produce a computer-implemented process such that the processor-executable instructions that execute on the computer or other programmable apparatus provide steps for implementing the functions specified in the flowchart block or blocks.

Accordingly, blocks of the block diagrams and flowcharts support combinations of devices for performing the specified functions, combinations of steps for performing the specified functions and program instruction means for performing the specified functions. It will also be understood that each block of the block diagrams and flowcharts, and combinations of blocks in the block diagrams and flowcharts, may be implemented by special purpose hardware-based computer systems that perform the specified functions or steps, or combinations of special purpose hardware and computer instructions.

This detailed description may refer to a given entity performing some action. It should be understood that this language may in some cases mean that a system (e.g., a computer) owned and/or controlled by the given entity is actually performing the action.

When a network device (e.g., a gateway, a router, an access point, etc.) utilizes more than one communication protocol, problems may arise when attempting to utilize one or more radios concurrently. For example, under normal usage of a Wi-Fi network, some communication protocols may be adversely affected because the communication protocols are low powered compared to Wi-Fi. One method for improving the communication capabilities of the low powered protocols is to have a designated time period (e.g., a quiet time) that the Wi-Fi devices are not communicating on the Wi-Fi network so that the low powered protocol has a clean (e.g., noise free) time window to communicate with the network device. However, this may negatively impact a user's experience when utilizing the Wi-Fi network. Further, this approach may be extremely resource intensive and waste resources because the Wi-Fi quiet time occurs irrespective of the time of day and does not take into account the utilization of the Wi-Fi network.

A wireless network device may pair with a wireless device (e.g., an Internet of Things (IoT) device). During the pairing process, the wireless network device and the wireless device may determine a polling time for the wireless device to communicate with the wireless network device. The communications between the wireless device and the wireless network device may have one or more connection attributes, such as a Link Quality Indicator (LQI), a Relative Received Signal Strength (RSSI), a Packet Error Rate (PER), and the like. If the one or more connection attributes change (e.g., if a location of a wireless device changes), the changed connection attributes may be factored into a polling frequency, as well as an adjustment to the power level of a wireless network (e.g., Wi-Fi) associated with the wireless network device to accommodate receiver sensitivity for the wireless device. Thus, the communications from the wireless device may have better noise isolation, and the ability for the wireless network device to receive communications from the wireless device may be increased.

The wireless network device may concatenate one or more bands of a wireless network to improve the signal to noise ratio of communications from the wireless device. A wireless network may have one or more communication bands. For example, a Wireless Personal Area Network (WPAN), such as ZigBee, may have one or more communications bands. The bands may each have an associated width (e.g., 2 MHz wide). Further, each of these bands may be spaced a certain value apart. For example, the bands may be 5 MHz apart. In comparison, a Wi-Fi network may have bands that are 20 MHz or 40 MHz wide that operate on the same channel as the WPAN. Thus, if the WPAN and Wi-Fi network are communicating concurrently, the communications of the WPAN may be very noisy due to the low signal bandwidth as compared to the Wi-Fi network. Accordingly, the communications of the WPAN network may not be received by the wireless network device when a Wi-Fi communication is actively transmitting on the Wi-Fi network since the Wi-Fi network and the WPAN network may utilize the same channel. While a Wi-Fi network and a WPAN network have been described for ease of explanation, a person skilled in the art would appreciate that interference may occur between any wireless communication operating on the same wireless band. Thus, the present disclosure should not be limited to the aforementioned examples.

To improve the ability for the wireless network device to receive communications via a first wireless network, the wireless network device may concatenate two or more bands of the first wireless network when the wireless network device is not actively transmitting via the first wireless network. By concatenating two or more bands of the first wireless network, the concatenated bands have a larger bandwidth which may be approximately as wide as a second wireless network band to improve the Signal to Noise Ratio (SNR) of the first wireless band. Further, concatenating bands of the first wireless network will not disrupt other networks (e.g., the second wireless network) because it is a passive mechanism (e.g., a mechanism that does not require an active reduction of the second wireless network) that is employed when the wireless network device is in a receive mode to counter coexistence of the first wireless network and the second wireless network. When the wireless network device sends (e.g., transmits) a communication via the first wireless network, the wireless network device may only send the communication on one channel of the first wireless network, instead of the concatenated band.

For example, the wireless network device may concatenate two or more bands of a WPAN when the wireless network device is not actively transmitting via the WPAN. That is, the wireless network device may concatenate two or more bands of the WPAN when the wireless network device is listening and/or receiving communications via the WPAN. By concatenating two or more bands of the WPAN, the concatenated bands have a larger bandwidth which may be approximately as wide as a Wi-Fi band to improve the Signal to Noise Ratio (SNR) of the WPAN. Further, concatenating bands of the WPAN will not disrupt other networks (e.g., the Wi-Fi network) because it is a passive mechanism (e.g., a mechanism that does not require an active reduction of the Wi-Fi network) that is employed when the wireless network device is in a receive mode to counter coexistence of the WPAN and the Wi-Fi network. When the wireless network device sends (e.g., transmits) a communication via the WPAN, the wireless network device may only send the communication on one channel of the WPAN, instead of the concatenated band.

FIG. 1 shows an example system 100 for wireless communication. Those skilled in the art will appreciate that digital equipment and/or analog equipment may be employed. One skilled in the art will appreciate that provided herein is a functional description and that the respective functions may be performed by software, hardware, or a combination of software and hardware.

The system 100 may have a network device 102, computing devices 104, and/or wireless devices 106. Specifically, the system 100 has computing devices 104a,b,c and wireless devices 106a,b. As will be appreciated by one skilled in the art, the system 100 may have any quantity of network devices 102, computing devices 104, and wireless devices 106. The network device 102 may be a wireless communication device (e.g., a wireless router, a gateway, an access point, etc.). The network device 102 may utilize two or more communication protocols to communicate on two or more wireless networks. The network device 102 may have two more radio transceivers for utilizing the two or more communication protocols. A first wireless network and a second wireless network may communicate via the same channel. For example, the network device 102 may utilize a Wi-Fi communication protocol and may utilize a Wireless Personal Area Network (WPAN) protocol to provide two separate communication networks. The WPAN may be a ZigBee network. The Wi-Fi network and the WPAN may communicate via the same channel (e.g., a 2.4 GHz channel). The network device 102 may be configured with a first Service Set Identifier (SSID) (e.g., associated with a user network or private network) to function as a local network for a particular user or users. The network device 102 may be configured with a second SSID (e.g., associated with a public/community network or a hidden network) to function as a secondary network or redundant network for connected communication devices.

The computing devices 104a,b,c may be an electronic device such as a computer, a smartphone, a laptop, a tablet, a set top box, a display device, or other device capable of communicating with the network device 102. The computing devices 104 may communicate with the network device 102 via a wireless communication network (e.g., Wi-Fi, Bluetooth, etc.). The computing devices 104 may utilize the wireless network to communicate with the network device 102. The computing devices 104 may communicate via the network device 102 to access a service, such as the Internet.

The wireless devices 106a,b may be any electronic device such as a computer, a smartphone, a laptop, a tablet, a set top box, a display device, and/or a low powered electronic device (e.g., an IoT device) such as a sensor, a smart device, a security system (e.g., electronic camera, smart doorbell, etc.), and so forth. The wireless devices 106 may utilize a first wireless network (e.g., a WPAN and/or Wi-Fi network) to communicate with the network device 102. The wireless devices 106 may pair with the network device 102. The wireless devices 106 may pair with the network device 102 prior to communicating via the first wireless network (e.g., the WPAN and/or Wi-Fi network). The wireless devices 106 may provide one or more communication characteristics and/or attributes of the wireless devices 106 to the network device 102, such as Link Quality Indicator (LQI), Relative Received Signal Strength (RSSI), Packet Error Rate (PER), and so forth. The wireless devices 106 may provide the one or more communication characteristics and/or attributes of the wireless devices 106 to the network device 102 during the pairing process.

The wireless devices 106 may provide the network device 102 with a time period that the wireless devices 106 may send a communication to the network device 102. The wireless devices 106 may communicate with the network device 102 to determine the time period that the wireless devices 106 may send a communication to the network device 102. The communication may be one or more data packets sent from the wireless device 106 to the network device 102, such as a heartbeat signal. The network device 102 may keep track of (e.g., store in a data structure) a time period associated with each wireless device 106 that has paired with (e.g., registered with) the network device 102. The network device 102 may determine a time for each wireless device 106 to communicate with the network device 102. The network device 102 may determine, based on the time period, a time for each wireless device 106 to communicate with the network device 102. The network device 102 may ensure that no two wireless devices 106 are communicating during the same time period in order to avoid any interference between the communications of the wireless devices 106. That is, the network device 102 may determine non-overlapping time periods for each wireless device 106 to communicate with the network device 102. One or more of the wireless devices 106 may not be capable of modifying the time period that the wireless device 106 sends the communication to the network device 102. Accordingly, the network device 102 may only modify the time period of wireless devices 106 that are capable of modifying the time period that the wireless device 106 communicates with the network device 102.

After pairing with the network device 102, the wireless devices 106 may communicate with the network device 102 via the first wireless network. After pairing with the network device 102, a location of the wireless devices 106 may change. That is, during pairing, the wireless devices 106 may be placed close (e.g., a few inches, a foot, etc.) to the network device 102 to improve the pairing process. However, the final location of the wireless devices 106 may be further away from the network device 102, such as placed throughout a user's home. Thus, the communication characteristics may change based on the final location of the wireless devices 106. Accordingly, the network device 102 may modify and/or update one or more settings of one or more of the communication networks associated with the network device 102 based on the final location of the wireless devices 106.

The network device 102 may adjust one or more settings (e.g., a power level) of a wireless network associated with the network device 102. The network device 102 may adjust one or more settings of a first wireless network and/or a second wireless network. For example, the network device 102 may adjust one or more settings of the Wi-Fi network and/or the WPAN network. The network device 102 may adjust one or more settings of the wireless communication based on the final location of one or more of the wireless devices 106. The network device 102 may reduce a power level of one of the one or more wireless networks. For example, the network device 102 may reduce a power level of a signal and/or a communication associated with the wireless network. The network device 102 may reduce the power level of the wireless network during a time period that one or more of the wireless devices 106 may communicate with the network device 102. The network device 102 may determine the time period for when each wireless device 106 may communicate with the network device 102. The network device 102 may determine a window of time to adjust the one or more settings of the wireless network. The network device 102 may determine the window of time to adjust the one or more settings of the wireless network based on the time period when the wireless devices 106 communicate with the network device 102. The window of time may be any period of time (e.g., 1 ms, 5 ms, etc.). The window of time may be centered around the time period when the wireless devices 106 communicate with the network device 102. For example, if the wireless device 106a communicates with the network device 102 every 20 ms, the network device 102 may adjust the one or more settings of the wireless network from every 18 ms to 22 ms. Stated differently, the network device 102 may adjust the one or more settings of the wireless network at 18 ms, and then may adjust the one or more settings of the wireless network back to normal (e.g., the one or more settings standard operational value) 4 ms later at 22 ms. Thus, the window of time may be 4 ms (e.g., from 18 ms to 22 ms).

The network device 102 may adjust the time period that the wireless devices 106 communicate with the network device 102. The network device 102 may adjust the time period that the wireless devices 106 communicate with the network device 102 based on a signal strength of communications received from one or more of the wireless devices 106. The network device may increase (e.g., lengthen) the time period that a wireless device 106 communicates with the network device 102. The network device 102 may increase the time period that the wireless device 106 communicates with the network device 102 to reduce the number of communications sent by the wireless device 106 to the network device 102. By reducing the number of communications sent by the wireless device 106 to the network device 102, power of the wireless device 106 may be conserved. By conserving the power of the wireless device 106, the wireless device 106 may increase the power per communication sent. By increasing the power per communication sent by the wireless device 106, the communications may have an increased chance of being received by the network device 102. The network device 102 may decrease (e.g., shorten) the time period that the wireless device 106 communicates with the network device 102 to increase the number of communications sent by the wireless device 106 to the network device 102. The network device 102 may also increase or decrease the time period based on a utilization of a wireless network (e.g., the Wi-Fi network and/or the WPAN network). While the network device 102 has been described as adjusting the time period for ease of explanation, the wireless device 106 may have the same capabilities described above.

The network device 102 may reduce the power level of the first network during the time period that one or more of the wireless devices 106 may communicate with the network device 102 utilizing the second wireless network. For example, the network device 102 may reduce a power level associated with a signal associated with the first wireless network and/or a power level of a communication associated with the first wireless network. The network device 102 may reduce the power level of the first wireless network based on the communication characteristics associated with one or more of the wireless devices 106. The network device 102 may reduce the power level of the first wireless network based on a signal strength of communications received from one or more of the wireless devices 106. The network device 102 may reduce the power level of the first wireless network based on a distance of one or more of the wireless devices 106 from the network device 102. That is, the further the final location of a wireless device 106 is from the network device 102, the network device 102 may further reduce the power level of the first wireless network to ensure the wireless device 106 is capable of communicating with the network device 102 via the second wireless network. The network device 102 may modify one or more channels of the first wireless network to avoid conflict with the second wireless network. The network device 102 may reduce the channel bandwidth of the first wireless network. The reduction in the channel bandwidth may increase frequency separation to improve the wireless devices 106 ability to communicate on the second wireless network.

For example, the network device 102 may reduce the power level of the Wi-Fi network during the time period that one or more of the wireless devices 106 may communicate with the network device 102. The network device 102 may reduce the power level of the Wi-Fi network based on the communication characteristics associated with one or more of the wireless devices 106. The network device 102 may reduce the power level of the Wi-Fi network based on a signal strength of communications received from one or more of the wireless devices 106. The network device 102 may reduce the power level of the Wi-Fi network based on a distance of one or more of the wireless devices 106 from the network device 102. That is, the further the final location of a wireless device 106 is from the network device 102, the network device 102 may further reduce the power level of the Wi-Fi network to ensure the wireless device 106 is capable of communicating with the network device 102 over the WPAN network. The network device 102 may modify one or more channels of the Wi-Fi network to avoid conflict with the WPAN. The network device 102 may reduce the channel bandwidth of the Wi-Fi network. The reduction in the channel bandwidth may increase frequency separation to improve the wireless devices 106 ability to communicate on the WPAN. For example, the network device 102 may reduce the channel bandwidth from 40 MHz to 20 MHz.

The network device 102 may modify the reduction of the power level of the first wireless network based on when a wireless device 106 is communicating with the network device 102. For example, the network device 102 may modify the reduction of the power level of the Wi-Fi network based on when a wireless device 106 is communicating with the network device 102 (e.g., via the WPAN). Each wireless device 106 may communicate with the network device 102 at different times. The network device 102 may determine a power level reduction for each wireless device 106. The power level reduction may be based on the time period that the wireless device 106 may communicate with the network device 102. The network device 102 may modify the power level of the first wireless network based on which wireless device 106 may be communicating with the network device 102 during the time period. For example, the network device 102 may modify the power level of the Wi-Fi network based on which wireless device 106 may be communicating with the network device 102 during the time period. The power level reduction for each wireless device 106 may be unique. While the power level reduction for each wireless device 106 may be unique, the power level reduction may be the same for two or more wireless devices 106. The power level reduction may be based on one or more communication characteristics of the communication between the network device 102 and each wireless device 106.

The network device 102 may determine a window of time to reduce the power level of the first wireless network. The network device 102 may determine the window of time to adjust reduce the power level of the first wireless network based on the time period when the wireless devices 106 communicate with the network device 102 via the second wireless network. For example, the network device 102 may determine the window of time to adjust (e.g., reduce) the power level of the Wi-Fi network based on the time period when the wireless devices 106 communicate with the network device 102 via the WPAN. The window of time may be any period of time (e.g., 1 ms, 5 ms, etc.). The window of time may be centered around the time period when the wireless devices 106 communicate with the network device 102. For example, if the wireless device 106*a* communicates with the network device 102 every 20 ms, the network device 102 may reduce the power level of the first wireless network from every 18 ms to 22 ms. Stated differently, the network device 102 may reduce the power level of the first wireless network at 18 ms, and then may adjust the power level of the first wireless network back to normal (e.g., the one or more settings standard operational value) 4 ms later at 22 ms. Thus, the window of time may be 4 ms (e.g., from 18 ms to 22 ms).

The wireless device 106*a* may communicate with the network device 102 every 10 ms. The network device 102 may determine a power level of the first wireless network for when the wireless device 106*a* may communicate with the network device 102 (e.g., every 10 ms). The network device 102 may determine a power level reduction of the first wireless network for the time period that the wireless device 106*a* may communicate with the network device 102. The network device 102 may determine a window of time to reduce the power level of the first wireless network. The window of time may be based on the time period that the wireless device 106*a* may communicate with the network device 102.

The wireless device 106*a* may send data to the network device 102. The data may indicate a signal strength associated with the communication between the network device 102 and the wireless device 106*a*. The network device 102 may determine, based on the signal strength, a power level reduction of the first wireless network. For example, the network device 102 may determine that the power level of the Wi-Fi network may need to be reduced 20% based on the signal strength. The network device 102 may reduce the power level of the Wi-Fi network by 20% when the wireless device 106*a* communicates with the network device 102. The network device 102 may determine that the power level of the first wireless network may need to be reduced by 45% based on a signal strength associated with the communication from the wireless device 106*b* via the second wireless network. For example, the network device 102 may reduce the power level of the Wi-Fi network by 45% when the wireless device 106*b* communicates with the network device 102 via the WPAN.

The network device 102 may determine a power level reduction and a time period for the power level reduction for each wireless device 106 paired with the network device 102. The network device 102 may determine a respective power level reduction, a respective time period for the power level reduction, and a respective window of time to reduce the power level of the first wireless network for each wireless device 106 paired with the network device 102. For example, the network device 102 may determine a respective power level reduction, a respective time period for the power level reduction, and a respective window of time to reduce the power level of the Wi-Fi network for each wireless device 106 paired with the network device 102.

The network device 102 may reduce the power level of the first wireless network a first power level reduction (e.g., 20%) during a time period that the wireless device 106*a* may communicate with the network device 102 via the second wireless network. For example, the wireless device 106*a* may communicate every 10 ms with the network device 102. The network device 102 may determine to modify the power level of the Wi-Fi network 20% every 10 ms to improve communication with the wireless device 106*a* via the second wireless network (e.g., the WPAN).

The network device 102 may determine a window of time to reduce the power level of the first wireless network. The network device 102 may determine to reduce the power level of the first wireless network for a 4 ms window of time. For example, the network device may determine to reduce the power level of the Wi-Fi network from 8 ms to 12 ms (e.g., a 4 ms window of time every 10 ms). The network device may determine to reduce the power level of the Wi-Fi network 20% from 8 ms to 12 ms to improve communications with the wireless device 106*a* via the second wireless network (e.g., the WPAN). The network device 102 may reduce the power level of the first wireless network a second power level reduction (e.g., 45%) during a time period that the wireless device 106*b* may communicate with the network device 102. For example, the wireless device 106*b* may communicate every 15 ms with the network device 102. The network device 102 may determine to modify the power level of the Wi-Fi network 45% every 15 ms to improve communication with the wireless device 106*b* via the second wireless network (e.g., the WPAN). The network device 102 may determine a window of time to reduce the power level of the first wireless network. The network device 102 may determine to reduce the power level of the first wireless network for a 2 ms window of time. The network device may determine to reduce the power level of the first wireless network from 14 ms to 16 ms (e.g., a 1 ms window of time every 15 ms). The network device may determine to reduce the power level of the first wireless network 45% from 14 ms to 16 ms to improve communications with the network device 106*b* via the second wireless network.

The network device 102 may dynamically modify the power level of the first wireless network (e.g., a Wi-Fi network) during the time period that one or more of the wireless devices 106 may communicate with the network device 102 via the second wireless network (e.g., a WPAN). The network device 102 may dynamically modify the power level of the first wireless network based on usage of the first wireless network. The network device 102 may increase or decrease the power level of the first wireless network based on usage of the first wireless network. The network device 102 may determine a network utilization of the first wireless network. The network device 102 may determine the network utilization of the first wireless network based on a usage of the first wireless network by the computing devices 104. The network device 102 may determine the network utilization of the first wireless network based on the available bandwidth of the first wireless network. If the computing devices 104 are heavily using the first wireless network (e.g., performing bandwidth intensive tasks such as streaming high definition content), the network device 102 may not reduce the power level of the first wireless network in order to ensure that a user utilizing the computing devices 104 does not have a negative experience while heavily using the first wireless network. The network device 102 may modify the reduction of the power level of the first wireless network based on the usage of the first wireless network by the computing devices 104. The network device 102 may reduce the power level of the first wireless network if the computing devices 104 are not utilizing a large portion of the first wireless network bandwidth in order to improve communications with the wireless devices 106.

The network device 102 may determine to not reduce the power level of the first wireless network during a first time period that one or more of the wireless devices 106 may communicate with the network device 102 via the second wireless network. For example, the network device 102 may determine to not reduce the power level of the Wi-Fi network during a first time period that one or more of the wireless devices 106 may communicate with the network device 102 via the WPAN. The wireless devices 106 may send a quantity (e.g., 2, 3, 5, 20, etc.) of communications (e.g., during a first time period, a second time period after the first time period, and so forth) without receiving a confirmation from the network device 102. The wireless devices 106 may not send a communication if the quantity of communications satisfies a threshold. The quantity of communications satisfying the threshold may indicate an error associated with the communication network. The wireless devices 106 may determine after the quantity of communications are sent that an error has occurred with the second wireless network such that the wireless devices 106 should not continue attempting to send communications via the second wireless network.

The network device 102 may determine the quantity of attempts that the wireless devices 106 may attempt to communicate with the network device 102 before the wireless devices 106 cease attempting to communicate with the network device 102. The network device 102 may determine the quantity of attempts to communicate based on pairing with the wireless devices 106. The network device 102 may determine to not modify the power level of the first wireless network (e.g., a Wi-Fi network) based on a quantity of communications received from a wireless device 106 via a second wireless network (e.g., a WPAN). That is, the network device 102 may determine to ignore one or more communications from the wireless device 106 by not reducing a power level of the first wireless network when the wireless device 106 may attempt to communicate with the network device 102. The network device 102 may dynamically determine to not modify the power level of the first wireless network based on a quantity of communications received from a wireless device 106 (e.g., via the second wireless network) and a usage of the first wireless network.

The network device 102 may utilize a data structure to determine the quantity of communications from a wireless device 106 that the network device 102 may ignore (e.g., not respond to). The network device 102 may determine a quantity of time periods that the network device 102 may not reduce the power level of the first wireless (e.g., a Wi-Fi network) based on the quantity of communications that the wireless device 106 may send before the wireless device 106 will halt communications. For example, the network device 102 may determine that a wireless device 106 will make three separate attempts to communicate with the network device 102 via the second wireless network (e.g., the WPAN) before halting communications. The network device 102 may determine that the network device 102 may ignore (e.g., not respond to) two communications from the wireless device 106 before the wireless device 106 stops communicating with the network device 102. The network device 102 may determine the time periods associated with the two communications from the wireless device 106. The network device 102 may determine, based on the time periods, a period of time the network device 102 may ignore (e.g., not respond to) communications from the wireless device 106. Accordingly, the network device 102 may not reduce power level of the first wireless network (e.g., the Wi-Fi network) during the time period that the network device 102 may ignore the wireless device 106 in order to ensure the best possible bandwidth for the first wireless network, while also preventing the wireless device 106 from determining that the wireless device 106 should stop communicating with the network device 102.

The network device 102 may concatenate one or more bands of the second wireless network. For example, the network device 102 may concatenate one or more bands of a WPAN. The bands of the second wireless network may be smaller bands as compared to bands of the first wireless network. For example, the bands of the WPAN may be smaller (e.g., 5 MHz bands) as compared to a Wi-Fi band (e.g., 20 MHz bands). Thus, the bands of the second wireless network may be difficult for the network device 102 to discern when communications on the second wireless network (e.g., the WPAN) and the first wireless network (e.g., the Wi-Fi network) are occurring concurrently. For example, the larger Wi-Fi bands may increase the interference with the WPAN bands if the two networks communicate concurrently as the Wi-Fi bands and WPAN bands utilize the same channel. The network device 102 may concatenate one or more bands of the second wireless network to create a new band to improve the ability for the network device 102 to receive communications from the wireless devices 106. The network device 102 may concatenate a predetermined quantity of bands of the second wireless network such that the concatenated band has approximately the same bandwidth as a band of the first wireless network. For example, the network device 102 may concatenate a predetermined quantity of bands of the WPAN such that the concatenated band has approximately the same bandwidth as a Wi-Fi band. Thus, the concatenated band of the second wireless network would have a similar bandwidth of the first wireless network band which would improve the Signal to Noise Ratio (SNR) of the concatenated second wireless network band compared to the non-concatenated second wireless network bands. By improving the SNR of the second wireless network communications, the network device 102 may improve the ability of the network device 102 to receive communications from the wireless devices 106.

The network device 102 may concatenate the one or more bands only when the network device 102 is not actively transmitting a communication on the second wireless network (e.g., the WPAN). That is, the network device 102 may concatenate the one or more bands of the second wireless network when listening for a communication from the wireless devices 106, but the network device 102 may utilize a single unconcatenated band of the second wireless network to transmit a communication to the wireless devices 106. By utilizing a single band of the second wireless network for sending a communication, the network device 102 may reduce the impact on the first wireless network (e.g., the Wi-Fi network).

Figure 2:
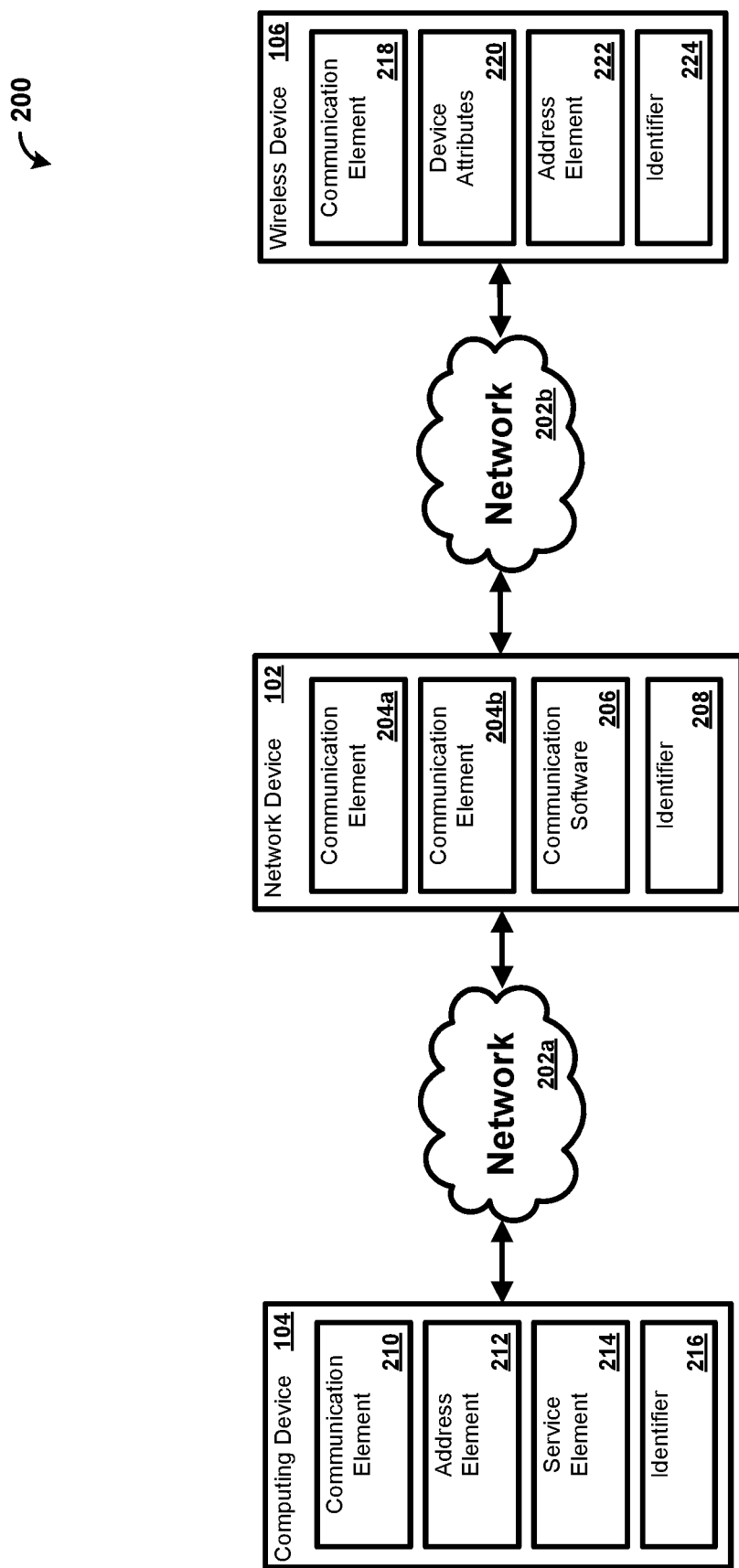
FIG. 2 shows an example system for wireless communication.

FIG. 2 shows an example system 200 for wireless communication. Those skilled in the art will appreciate that digital equipment and/or analog equipment may be employed. One skilled in the art will appreciate that provided herein is a functional description and that the respective functions may be performed by software, hardware, or a combination of software and hardware.

The system 200 may have a network device 102, a computing device 104, and a wireless device 106. The network device 102 may facilitate the connection of a device, such as the computing device 104 and/or the wireless device 106, to a network (e.g., the networks 202). The network device 102 may communicate with the computing device 104 via a first network 202a, and the network device 102 may communicate with the wireless device 106 via a second network 202b. The first network 202a may be a Wi-Fi network, and the second network 202b may be a WPAN (e.g., a ZigBee network).

The network device 102 may be configured as a local area network (LAN). The network device 102 may be a dual band wireless communication device. The network device 102 may be a gateway device for communicating with another network, such as a communication network provided by an Internet Service Provider. The network device 102 may be configured with a first service set identifier (SSID) (e.g., associated with a user network or private network) to function as a local network for a particular user or users. The network device 102 may be configured with a second service set identifier (SSID) (e.g., associated with a public/community network or a hidden network) to function as a secondary network or redundant network for connected communication devices. The network device 102 may be configured to allow one or more wireless devices to connect to a wired and/or wireless network using Wi-Fi, Bluetooth or any desired method or standard.

The network device 102 may have communication elements 204a,b, communication software 206, and an identifier 208. The communication elements 204a,b may be wireless transceivers configured to transmit and receive wireless communications via a wireless network (e.g., the networks 202a,b). The communication elements 204a,b may be configured to communicate via a specific network protocol. For example, the communication element 204a may be a wireless transceiver configured to communicate via a Wi-Fi network, and the communication element 204b may be a wireless transceiver configured to communicate via a WPAN. The network device 102 may communicate with the computing device 104 on the network 202a via the communication element 204a. The network device 102 may communicate with the wireless device 106 on the network 202b via the communication element 204b.

The network device 102 may have communication software 206. The communication software 206 may be any combination of firmware, software, and/or hardware. The communication software 206 may pair the network device 102 with the wireless device 106. That is, the communication software 206 may facilitate an initial handshake between the network device 102 and the wireless device 106 in order to facilitate the network device 102 communicating with the wireless device 106 via the network 202b. The communication software 206 may determine one or more attributes of the wireless device 106 (e.g., the device attributes 220). The communication software 206 may determine a time period that the wireless device 106 may send a communication to the network device 102.

The communication software 206 may modify and/or update one or more settings of one or more of the communication networks associated with the network device 102 (e.g., the network 202a) based on one or more communication attributes of the wireless device 106. The communication software 206 may adjust one or more settings of the network 202a based on the one or more communication attributes of the wireless device 106. For example, the communication software 206 may modify a power associated with the network 202a based on the one or more communication attributes of the wireless device 106. The communication software 206 may reduce the power level of the network 202a during a time period that the wireless device 106 may communicate with the network device 102 via the network 202b. That is, the communication software 206 may reduce the power provided to and/or output by the communication element 204a. The communication software 206 may reduce the power level of the network 202a based on a range (e.g., a distance from) of the wireless device 106 from the network device 102. That is, the further the wireless device 106 is from the network device 102, the communication software may increase the amount of power reduction of the network 202a to ensure the wireless device 106 is capable of communicating with the network device 102. The communication software 206 may modify a channel associated with the network 202a, and/or reduce a bandwidth of a channel associated with the network 202a.

The communication software 206 may dynamically modify the power level of the network 202a based on usage of the network 202a. If the computing device 104 is heavily using the network 202a (e.g., performing bandwidth intensive tasks such as streaming high definition content), the communication software 206 may not reduce the power level of the network 202a in order to ensure that a user utilizing the computing device 104 does not have a negative experience while heavily using the network 202a. The communication software 206 may increase the power level of the network 202a during the heavy usage of the network 202a to improve the experience of a user associated with the computing device 104. The communication software 206 may reduce the power level of the network 202a if the computing device 104 is not utilizing a large portion of the network 202a in order to improve communications with the wireless device 106 via the network 202b. That is, the communication software 206 may determine that a power level of the network 202a may be reduced without impacting any computing devices 104 communicating view the network 202a.

The communication software 206 may dynamically modify the power level of the network 202a during the time period that one or more of the wireless devices 106 may communicate with the network device 102. The communication software 206 may dynamically modify the power level of the network 202a based on usage of the network 202a. The communication software 206 may increase or decrease the power level of the network 202a based on usage of the network 202a. The communication software 206 may determine a network utilization of the network 202a. The communication software 206 may determine the network utilization of the network 202a based on a usage of the network 202*a* by the computing device 104. The communication software 206 may determine the network utilization of the network 202*a* based on the available bandwidth of the network 202*a*. If the computing device 104 is heavily using the network 202*a* (e.g., performing bandwidth intensive tasks such as streaming high definition content), the communication software 206 may not reduce the power level of the network 202*a* in order to ensure that a user utilizing the computing device 104 does not have a negative experience while heavily using the network 202*a*. The communication software 206 may modify the reduction of the power level of the network 202*a* based on the usage of the network 202*a* by the computing device 104. The communication software 206 may reduce the power level of the network 202*a* if the computing device 104 is not utilizing a large portion of the bandwidth of the network 202*a* in order to improve communications with the wireless devices 106.

The communication software 206 may determine to not reduce the power level of the network 202*a* during a first time period that one or more of the wireless devices 106 may communicate with the network device 102 via the network 202*b*. The wireless device 106 may send a quantity (e.g., 2, 3, 5, 20, etc.) of communications (e.g., during a first time period, a second time period after the first time period, and so forth) without receiving a confirmation from the network device 102. The wireless device 106 may not send a communication if the quantity of communications satisfies a threshold. The quantity of communications satisfying the threshold may indicate an error associated with the communication network. The wireless device 106 may determine after the predetermined quantity of communications are sent that an error has occurred with the network 202*b* such that the wireless devices 106 should not continue attempting to send communications via the network 202*b*. The communication software 206 may determine the quantity of attempts that the wireless devices 106 may attempt to communicate with the network device 102 before the wireless devices 106 cease attempting to communicate with the network device 102.

The communication software 206 may determine the quantity of attempts based on pairing with the wireless device 106. The communication software 206 may determine to not modify the power level of the network 202*a* based on a quantity of communications received from a wireless device 106. The communication software 206 may dynamically determine to not modify the power level of the network 202*a* based on a quantity of communications received from a wireless device 106 and a usage of the network 202*a*. The communication software 206 may utilize a data structure that has the quantity of communications that the wireless device 106 will attempt to communicate with the network device 102. The communication software 206 may utilize the data structure to determine the quantity of communications from the wireless device 106 that the network device 102 may ignore (e.g., not respond to). The communication software 206 may determine a quantity of time periods that the communication software 206 may not reduce the power level of the network 202*a* based on the quantity of communications that the wireless device 106 may send. The communication software 206 may determine that a wireless device 106 will make three separate attempts to communicate with the network device 102 before halting communications. The communication software 206 may determine that the network device 102 may ignore (e.g., not respond to) two communications from the wireless device 106 before the wireless device 106 stops communicating. The communication software 206 may determine the time periods associated with the two communications from the wireless device 106. The communication software 206 may determine, based on the time periods, a period of time the network device 102 may ignore (e.g., not respond to) communications from the wireless device 106. Accordingly, the communication software 206 may not reduce power level of the network 202*a* during the time period that the network device 102 may ignore the wireless device 106 in order to ensure the best possible bandwidth for the network 202*a*, while also preventing the wireless device 106 from determining the wireless device 106 should stop communicating with the network device 102 via the network 202*b*.

The communication software 206 may concatenate one or more bands of a wireless network. The communication software 206 may concatenate one or more bands of the network 202*b* (e.g., the WPAN). The bands of the network 202*b* may be smaller (e.g., 5 MHz bands) as compared to the network 202*a* (e.g., 20 MHz bands, 40 MHz bands, etc.). Thus, the bands of the network 202*b* may be difficult for the network device 102 to discern when communications on the network 202*b* and the network 202*a* are occurring concurrently. The communication software 206 may concatenate one or more bands of the network 202*b* to create a new band with greater bandwidth to improve the ability for the network device 102 to receive communications from the wireless device 106. The communication software 206 may concatenate a predetermined quantity of bands of the network 202*b* such that the concatenated band has approximately the same bandwidth as a band of the network 202*a*. Thus, the concatenated band of the network 202*b* would have a similar bandwidth as the band of the network 202*a* which would improve the Signal to Noise Ratio (SNR) of the concatenated band of the network 202*b* compared to the non-concatenated bands of the network 202*b*.

The communication software 206 may concatenate the one or more bands only when the communication element 204*b* is not actively transmitting a communication on the network 202*b*. That is, the communication software 206 may concatenate the one or more bands of the network 202*b* when listening for a communication from the wireless device 106, but the communication element 204*b* may utilize a single unconcatenated band of the network 202*b* to transmit a communication to the wireless device 106. By utilizing a single band of the network 202*b*, the communication software 206 may reduce the impact on the network 202*a*.

The network device 102 may have an identifier 208. The identifier 208 may be or relate to an Internet Protocol (IP) Address IPV4/IPV6 or a media access control address (MAC address) or the like. The identifier 208 may be a unique identifier for facilitating wired and/or wireless communications with the network device 102. The identifier 208 may be associated with a physical location of the network device 102.

The computing device 104 may have a communication element 210, an address element 212, a service element 214, and an identifier 216. The computing device 104 may be an electronic device such as a computer, a smartphone, a laptop, a tablet, a set top box, a display device, or other device capable of communicating with the network device 102. The communication element 210 may be a wireless transceiver configured to transmit and receive wireless communications via a wireless network (e.g., the network 202*a*). The communication element 210 may be configured to communicate via one or more wireless networks. The communication element 210 may be configured to communicate via a specific network protocol. The communication element 210 may be a wireless transceiver configured to communicate via a Wi-Fi network (e.g., network 202a). The computing device 104 may communicate with the network device 102 on the network 202a via the communication element 210.

The computing device 104 may have an address element 212 and a service element 214. The address element 212 may comprise or provide an internet protocol address, a network address, a media access control (MAC) address, an Internet address, or the like. The address element 212 may be relied upon to establish a communication session between the computing device 104 and the network device 102 or other devices and/or networks. The address element 212 may be used as an identifier or locator of the computing device 104. The address element 212 may be persistent for a particular network (e.g., the network 202a).

The service element 214 may comprise an identification of a service provider associated with the computing device 104 and/or with the class of computing device 104. The class of the computing device 104 may be related to a type of device, capability of device, type of service being provided, and/or a level of service (e.g., business class, service tier, service package, etc.). The service element 214 may comprise information relating to or provided by a communication service provider (e.g., Internet service provider) that is providing or enabling data flow such as communication services to the computing device 104. The service element 214 may comprise information relating to a preferred service provider for one or more particular services relating to the computing device 104. The address element 212 may be used to identify or retrieve data from the service element 214, or vice versa. The one or more of the address element 212 and the service element 214 may be stored remotely from the computing device 104. Other information may be represented by the service element 214.

The computing device 104 may be associated with a user identifier or device identifier 216. The device identifier 216 may be any identifier, token, character, string, or the like, for differentiating one user or computing device (e.g., the computing device 104) from another user or computing device. The device identifier 216 may identify a user or computing device as belonging to a particular class of users or computing devices. The device identifier 216 may comprise information relating to the computing device 104 such as a manufacturer, a model or type of device, a service provider associated with the computing device 104, a state of the computing device 104, a locator, and/or a label or classifier. Other information may be represented by the device identifier 216.

The wireless device 106 may have a communication element 218, device attributes 220, an address element 222, and an identifier 224. The wireless device 106 may be an electronic device such as a sensor, smart TV, smart speakers, toys, wearable electronics, smart appliance, smart meters, security systems, or other devices capable of communicating with the network device 102. The communication element 218 may be a wireless transceiver configured to transmit and receive wireless communications via a wireless network (e.g., the networks 202b). The communication element 218 may be configured to communicate via one or more wireless networks. The communication element 218 may be configured to communicate via a specific network protocol. The communication element 218 may be a wireless transceiver configured to communicate via a WPAN (e.g., the network 202b) such as a ZigBee network. The wireless device 106 may communicate with the network device 102 on the network 202b via the communication element 218.

The wireless device 106 may have device attributes 220. The device attributes 220 may indicate one or more attributes about the wireless device 106, such as operating characteristics of the wireless device 106. The device attributes 220 may indicate Link Quality Indicator (LQI), Relative Received Signal Strength (RSSI), Packet Error Rate (PER), channel selection, potential bands for use by the wireless device 106, channels the wireless device 106 may avoid communicating on, frequency of heartbeat, sleep duration, and so forth. The device attributes 220 may indicate how the wireless device 106 operates. That is, the device attributes 220 may indicate the time period that the wireless device 106 will communicate with the network device 102. Further, the device attributes 220 may indicate a power and/or a range associated with the communication element 218. The wireless device 106 may provide the device attributes 220 to the network device 102 to facilitate the network device 102 communicating with the wireless device 106 via the network 202b.

The wireless device 106 may have an address element 222. The address element 222 may comprise or provide an internet protocol address, a network address, a media access control (MAC) address, an Internet address, or the like. The address element 222 may be relied upon to establish a communication session between the wireless device 106 and the network device 102 via the network 202b or other devices and/or networks. The address element 222 may be used as an identifier or locator of the wireless device 106. The address element 222 may be persistent for a particular network (e.g., the network 202b).

The wireless device 106 may be associated with a user identifier or device identifier 224. The device identifier 224 may be any identifier, token, character, string, or the like, for differentiating one user or wireless device (e.g., the wireless device 106) from another user or wireless device. The device identifier 224 may identify a user or wireless device 106 as belonging to a particular class of users or wireless devices 106. The device identifier 224 may comprise information relating to the wireless device 106 such as a manufacturer, a model or type of device, a service provider associated with the wireless device 106, a state of the wireless device 106, a locator, and/or a label or classifier. Other information may be represented by the device identifier 224.

FIGS. 3A-3D show example diagrams of wireless communication channels. FIG. 3A shows a diagram 300 having three Wi-Fi bands 302a,b,c. The Wi-Fi bands may each have an associated width. For example, the Wi-Fi bands 302a,b,c may be 20 MHz wide, 40 MHz wide, or any width. FIG. 3B shows a diagram 325 having the three Wi-Fi bands 302a,b,c of FIG. 3A overlaid with a plurality of WPAN bands 304. The plurality of WPAN bands 304 may contain the same total bandwidth of the Wi-Fi bands 302a,b,c. The Wi-Fi bands 302a,b,c and the WPAN bands 304 may operate on the same frequency (e.g., 2.4 GHz). The WPAN bands 304 may have an associated width and may be spaced a distance apart. For example, the WPAN bands 304 may be 2 MHz wide and may be spaced 5 MHz apart. Based on the relatively small size of the WPAN bands 304 as compared to the Wi-Fi bands 302a,b,c, the WPAN bands 304 will have a much higher Signal to Noise Ratio (SNR) than the Wi-Fi bands 302a,b,c when the WPAN and the Wi-Fi network are communicating concurrently. To improve the SNR, the WPAN bands 304 may be concatenated together. FIG. 3C shows a diagram 350 of concatenated WPAN bands 306a, b,c,d. The concatenated WPAN bands 306a,b,c,d are the WPAN bands 304 that have been concatenated into larger WPAN bands. Thus, the concatenated WPAN bands 306a, b,c,d have a higher SNR as compared to the WPAN bands 304. FIG. 3D shows a diagram 375 of concatenated WPAN bands 308a,b. The concatenated WPAN bands 308a,b are the WPAN bands 306a,b,c,d that have been concatenated into larger WPAN bands. Thus, the concatenated WPAN bands 308a,b have a higher SNR as compared to the WPAN bands 306a,b,c,d.

FIG. 4 is a flowchart of an example method 400 for wireless communication. At step 410, a computing device (e.g., the computing device 104 and/or the wireless device 106 of FIGS. 1 & 2) may receive one or more attributes of another computing device and/or a network device (e.g., the network device 102 of FIGS. 1 & 2). For example, the computing device may pair with the another computing device and/or a network device (e.g., the network device 102 of FIGS. 1 & 2). A pairing request may be received by the network device from the computing device. The pairing request may initiate the pairing. The pairing may occur via a first wireless network (e.g., via the networks 202a,b of FIG. 2). The first wireless network may be a WPAN network. For example, the WPAN network may be a ZigBee network. The pairing may occur via another communication protocol such as Near Field Communication (NFC). One or more attributes (e.g., the device attributes 220 of FIG. 2) of the computing device may be received during the pairing. The one or more attributes of the computing device may be received by the network device during the pairing.

At step 420, a time period for communicating with the computing device may be determined. The network device may determine the time period for communicating with the computing device. The time period for communicating with the computing device may be based on the one or more attributes of the computing device received during the pairing. The time period may be based on a time that the computing device will transmit a heartbeat signal. The time period may be associated with the first wireless network.

At step 430, data that indicates one or more connection attributes (e.g., the connection attributes 220 of FIG. 2) may be received. The network device may receive the data that indicates the one or more connection attributes. The network device may receive the data that indicates the one or more connection attributes from the computing device. The network device may receive the data from the computing device via the first wireless network. The data may be received during the determined time period. The data may indicate one or more connection attributes associated with the transmission of the data. The one or more connection attributes may be a Link Quality Indicator (LQI), a Relative Received Signal Strength (RSSI), or a Packet Error Rate (PER).

At step 440, a power level reduction of a wireless network may be determined. The power level reduction of the wireless network may be determined by the network device. The power level reduction may be of the second wireless network. The power level reduction may be of a signal and/or communication associated with the second wireless network. The power level reduction may be configured to occur during the determined time period. The power level reduction may be dynamically determined. The power level reduction may be based on a bandwidth of the second wireless network during the time period. The power level reduction may be based on a quantity of computing devices communicating via the second wireless network. The power level reduction may be based on a quantity of computing devices communicating via the second wireless network during the determined time period. The second wireless network may be a Wi-Fi network. The network device may modify a power level associated with the second wireless network during the time period. The network device may reduce the power level of the second wireless network during the determined time period. The network device may receive data that indicates a communication (e.g., from the computing device). The network device may receive the data that indicates the communication during the time period (e.g., when the power level associated with the second wireless network is modified).

FIG. 5 is a flowchart of an example method 500 for wireless communication. At step 510, a computing device (e.g., the computing device 104 and/or the wireless device 106 of FIGS. 1 & 2) may receive one or more attributes of another computing device and/or a network device (e.g., the network device 102 of FIGS. 1 & 2). For example, the computing device may pair with the another computing device and/or a network device (e.g., the network device 102 of FIGS. 1 & 2). A pairing request may be received by the network device from the computing device. The pairing request may initiate the pairing. The pairing may occur via a first wireless network (e.g., via the networks 202a,b of FIG. 2). The first wireless network may be a WPAN network. The WPAN network may be a ZigBee network. The pairing may occur via another communication protocol such as Near Field Communications (NFC). One or more attributes (e.g., the device attributes 220 of FIG. 2) of the computing device may be received during the pairing. The one or more attributes of the computing device may be received by the network device during the pairing.

At step 520, a plurality of channel bands (e.g., the channel bands 302, 304, 306, and/or 308 of FIG. 3) that facilitate communication with the computing device may be determined (e.g., by the network device 102 of FIGS. 1 & 2). The plurality of channel bands may be associated with the first wireless network. The plurality of channel bands may be based on the one or more attributes of the computing device. The plurality of channel bands may have a bandwidth associated with a WPAN.

At step 530, a concatenated channel band (e.g., the concatenated channel bands 306 and/or 308 of FIG. 3) comprising the plurality of channel bands may be determined (e.g., by the network device 102 of FIGS. 1 & 2). The network device may determine the concatenated channel band. The concatenated channel band may have a bandwidth associated with a second wireless network. The concatenated channel band may have a bandwidth of a Wi-Fi network. The concatenated channel band may have an improved Signal to Noise Ratio (SNR) as compared to each of the plurality of channel bands.

At step 540, data may be received via the concatenated channel band (e.g., by the network device 102 of FIGS. 1 & 2). The data may be received via the first network. The data may be sent by the computing device via one of the plurality of channel bands. The network device may modify a power level associated with the second wireless network during the time period. The network device may reduce the power level of the second wireless network during the determined time period. The network device may receive data that indicates a communication (e.g., from the computing device). The network device may receive the data that indicates the communication during the time period (e.g., when the power level associated with the second wireless network is modified).

Figure 6:
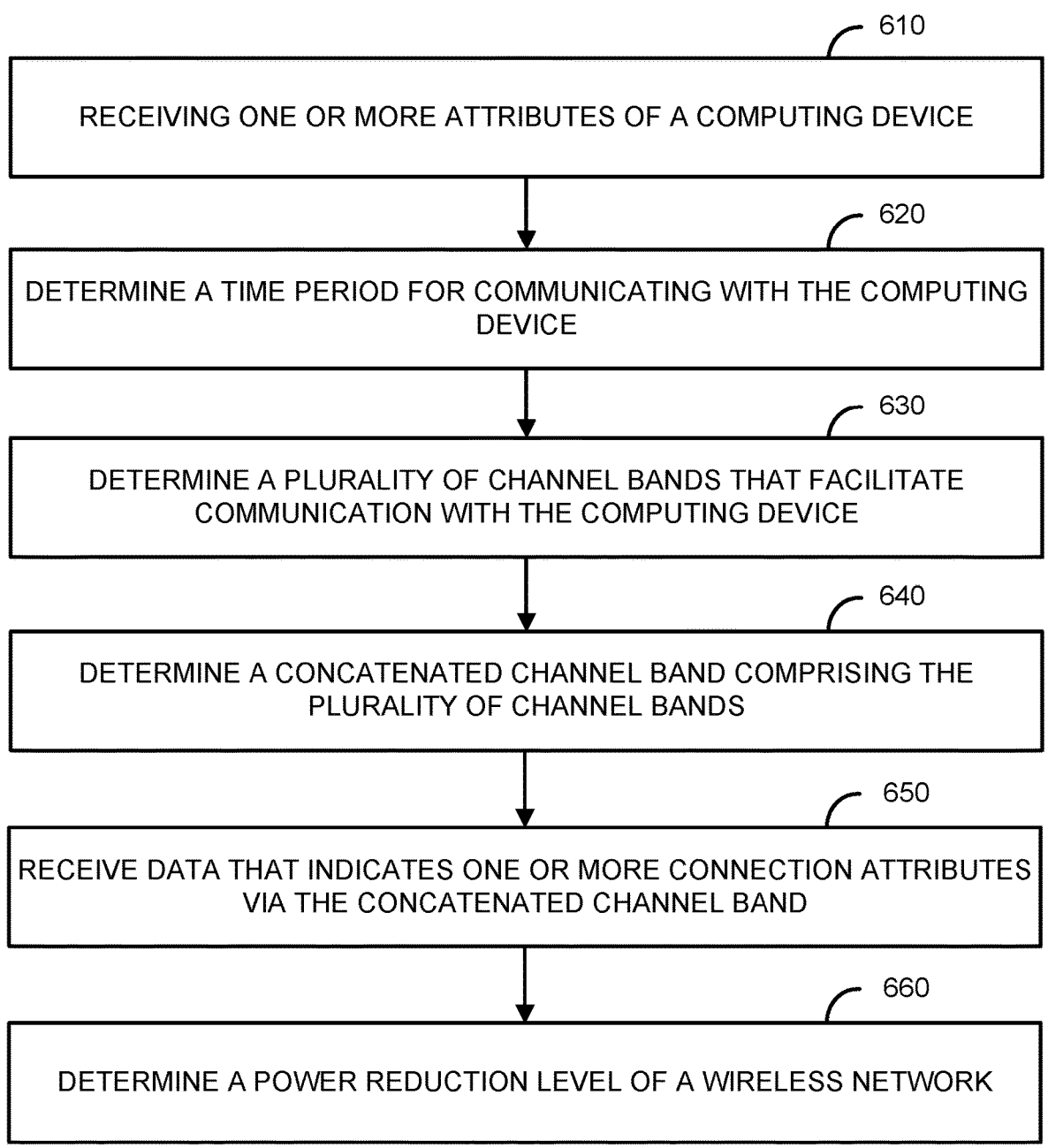
FIG. 6 shows a flowchart of an example method for wireless communication.

FIG. 6 is a flowchart of an example method 600 for wireless communication. At step 610, a computing device (e.g., the computing device 104 and/or the wireless device 106 of FIGS. 1 & 2) may receive one or more attributes of another computing device and/or a network device (e.g., the network device 102 of FIGS. 1 & 2). For example, the computing device may pair with the another computing device and/or a network device (e.g., the network device 102 of FIGS. 1 & 2). A pairing request may be received by the network device from the computing device. The pairing request may initiate the pairing. The pairing may occur via a first wireless network (e.g., via the networks 202a,b of FIG. 2). The first wireless network may be a WPAN network. The WPAN network may be a ZigBee network. The pairing may occur via another communication protocol such as Near Field Communication (NFC). One or more attributes (e.g., the device attributes 220 of FIG. 2) of the computing device may be received during the pairing. The one or more attributes of the computing device may be received by the network device during the pairing.

At step 620, a time period for communicating with the computing device may be determined. The network device may determine the time period for communicating with the computing device. The time period for communicating with the computing device may be based on the one or more attributes of the computing device received during the pairing. The time period may be based on a time that the computing device will transmit a heartbeat signal. The time period may be associated with the first wireless network.

At step 630, a plurality of channel bands (e.g., the channel bands 302, 304, 306, and/or 308 of FIG. 3) that facilitate communicating with the computing device may be determined (e.g., by the network device 102 of FIGS. 1 & 2). The plurality of channel bands may be associated with the first wireless network. The plurality of channel bands may be based on the one or more attributes of the computing device. The plurality of channel bands may have a bandwidth associated with a WPAN.

At step 640, a concatenated channel band (e.g., the concatenated channel bands 306 and/or 308 of FIG. 3) comprising the plurality of channel bands may be determined (e.g., by the network device 102 of FIGS. 1 & 2). The network device may determine the concatenated channel band. The concatenated channel band may have a bandwidth associated with a second wireless network. The concatenated channel band may have a bandwidth of a Wi-Fi network. The concatenated channel band may have an improved Signal to Noise Ratio (SNR) as compared to each of the plurality of channel bands.

At step 650, data may be received via the concatenated channel band (e.g., by the network device 102 of FIGS. 1 & 2). The data may be received by via the first network. The data may be sent by the computing device via one of the plurality of channel bands. The data may be received during the determined time period. The data may be received by the network device during the determined time period. The data may indicate one or more connection attributes associated with the transmission of the data. The one or more connection attributes may be a Link Quality Indicator (LQI), a Relative Received Signal Strength (RSSI), or a Packet Error Rate (PER). The data may be received via the concatenated channel band.

At step 660, a power level reduction of a wireless network may be determined by a computing device (e.g., the network device 102 of FIGS. 1 & 2). The power level reduction of the wireless network may be determined by the network device. The power level reduction may be of the second wireless network. The power level reduction may be of a signal and/or communication associated with the second wireless network. The power level reduction may be during the determined time period. The power level reduction may be dynamically determined. The power level reduction may be based on a bandwidth of the second wireless network during the time period. The power level reduction may be based on a quantity of computing devices communicating via the second wireless network. The power level reduction may be based on a quantity of computing devices communicating via the second wireless network during the determined time period. The second wireless network may be a Wi-Fi network. The network device may modify a power level associated with the second wireless network during the time period. The network device may reduce the power level of the second wireless network during the determined time period. The network device may receive data that indicates a communication (e.g., from the computing device). The network device may receive the data that indicates the communication during the time period (e.g., when the power level associated with the second wireless network is modified.

Figure 7:
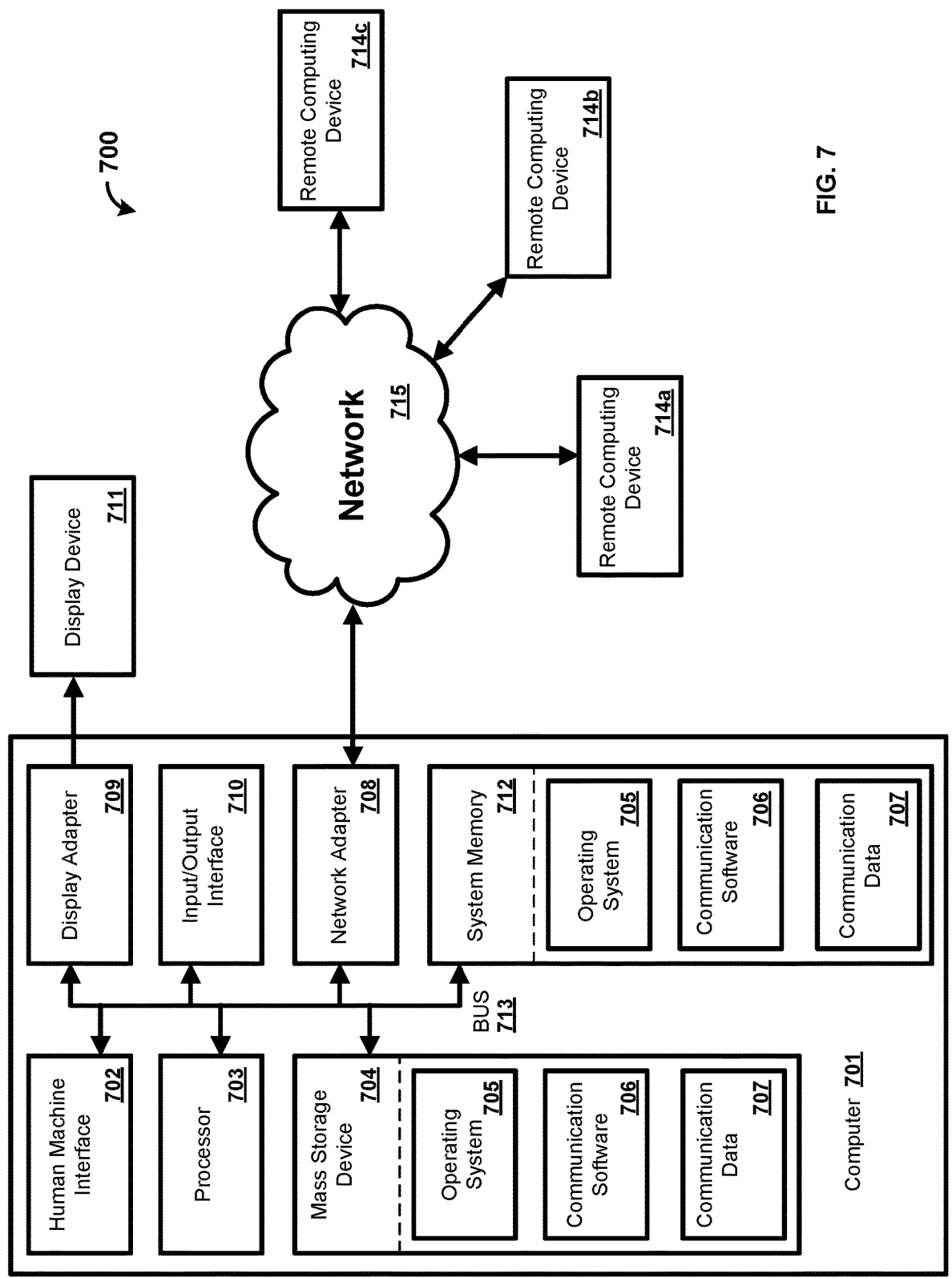
FIG. 7 shows a block diagram of an example computing device for wireless communication.

FIG. 7 shows an example system 700 for wireless communication. The network device 102, the computing device 104, and/or the wireless device 106 of FIGS. 1 & 2 may be a computer 701 as shown in FIG. 7.

The computer 701 may comprise one or more processors 703, a system memory 712, and a bus 713 that couples various system components including the one or more processors 703 to the system memory 712. In the case of multiple processors 703, the computer 701 may utilize parallel computing. The bus 713 is one or more of several possible types of bus structures, including a memory bus or memory controller, a peripheral bus, an accelerated graphics port, or local bus using any of a variety of bus architectures.

The computer 701 may operate on and/or comprise a variety of computer readable media (e.g., non-transitory). The readable media may be any available media that is accessible by the computer 701 and may include both volatile and non-volatile media, removable and non-removable media. The system memory 712 has computer readable media in the form of volatile memory, such as random access memory (RAM), and/or non-volatile memory, such as read only memory (ROM). The system memory 712 may store data such as the communication data 707 and/or program modules such as the operating system 705 and the communication software 706 that are accessible to and/or are operated on by the one or more processors 703.

The computer 701 may also have other removable/non-removable, volatile/non-volatile computer storage media. FIG. 7 shows the mass storage device 704 which may provide non-volatile storage of computer code, computer readable instructions, data structures, program modules, and other data for the computer 701. The mass storage device 704 may be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Any quantity of program modules may be stored on the mass storage device 704, such as the operating system 705 and the communication software 706. Each of the operating system 705 and the communication software 706 (or some combination thereof) may have elements of the program modules and the communication software 706. The communication data 707 may also be stored on the mass storage device 704. The communication data 707 may be stored in any of one or more databases known in the art. Such databases may be DB2®, Microsoft® Access, Microsoft®

SQL Server, Oracle®, mySQL, PostgreSQL, and the like. The databases may be centralized or distributed across locations within the network 715.

A user may enter commands and information into the computer 701 via an input device (not shown). Examples of such input devices comprise, but are not limited to, a keyboard, pointing device (e.g., a computer mouse, remote control), a microphone, a joystick, a scanner, tactile input devices such as gloves, and other body coverings, motion sensor, and the like These and other input devices may be connected to the one or more processors 703 via a human machine interface 702 that is coupled to the bus 713, but may be connected by other interface and bus structures, such as a parallel port, game port, an IEEE 1394 Port (also known as a Firewire port), a serial port, network adapter 708, and/or a universal serial bus (USB).

The display device 711 may also be connected to the bus 713 via an interface, such as the display adapter 709. It is contemplated that the computer 701 may have more than one display adapter 709 and the computer 701 may have more than one display device 711. The display device 711 may be a monitor, an LCD (Liquid Crystal Display), light emitting diode (LED) display, television, smart lens, smart glass, and/or a projector. In addition to the display device 711, other output peripheral devices may be components such as speakers (not shown) and a printer (not shown) which may be connected to the computer 701 via the Input/Output Interface 710. Any step and/or result of the methods may be output (or caused to be output) in any form to an output device. Such output may be any form of visual representation, including, but not limited to, textual, graphical, animation, audio, tactile, and the like. The display device 711 and computer 701 may be part of one device, or separate devices.

The computer 701 may operate in a networked environment using logical connections to one or more remote computing devices 714*a,b,c*. A remote computing device may be a personal computer, computing station (e.g., workstation), portable computer (e.g., laptop, mobile phone, tablet device), smart device (e.g., smartphone, smart watch, activity tracker, smart apparel, smart accessory), security and/or monitoring device, a server, a router, a network computer, a peer device, edge device, and so on. Logical connections between the computer 701 and a remote computing device 714*a,b,c* may be made via a network 715, such as a local area network (LAN) and/or a general wide area network (WAN). Such network connections may be through the network adapter 708. The network adapter 708 may be implemented in both wired and wireless environments. Such networking environments are conventional and commonplace in dwellings, offices, enterprise-wide computer networks, intranets, and the Internet.

Application programs and other executable program components such as the operating system 705 are shown herein as discrete blocks, although it is recognized that such programs and components reside at various times in different storage components of the computing device 701, and are executed by the one or more processors 703 of the computer. An implementation of the communication software 706 may be stored on or sent across some form of computer readable media. Any of the described methods may be performed by processor-executable instructions embodied on computer readable media.

While specific configurations have been described, it is not intended that the scope be limited to the particular configurations set forth, as the configurations herein are intended in all respects to be possible configurations rather than restrictive.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of configurations described in the specification.

It will be apparent to those skilled in the art that various modifications and variations may be made without departing from the scope or spirit. Other configurations will be apparent to those skilled in the art from consideration of the specification and practice described herein. It is intended that the specification and described configurations be considered as exemplary only, with a true scope and spirit being indicated by the following claims.

What is claimed is:

1. A method comprising:
   determining, by a first computing device associated with a first wireless network, an estimated distance to a second computing device;
   determining, based on the estimated distance, a reduced power level associated with a second wireless network; and
   causing transmission of one or more signals, associated with the second wireless network, at the reduced power level.

2. The method of claim 1, wherein the first computing device is one of a wireless router, a gateway, or an access point.

3. The method of claim 1, wherein causing transmission of the one or more signals at the reduced power level comprises causing, during a time period the first computing device receives a communication from the second computing device via the first wireless network, the transmission of the one or more signals, associated with the second wireless network, at the reduced power level.

4. The method of claim 1, wherein an amount a power level of the second wireless network is reduced increases as the estimated distance to the second computing device increases.

5. The method of claim 1, wherein the first wireless network comprises one or more of a Wireless Personal Area Network (WPAN), Zigbee, Bluetooth, or Wi-Fi, and wherein the second wireless network comprises one or more of Wi-Fi, WPAN, Zigbee, or Bluetooth.

6. The method of claim 1, wherein the first wireless network comprises a first communication protocol and the second wireless network comprises a second communication protocol and wherein a power level associated with the first communication protocol is lower than a second power level associated with the second communication protocol.

7. The method of claim 1, wherein determining the reduced power level associated with the second wireless network is further based on a quantity of other computing devices communicating via the second wireless network.

8. A first computing device comprising:
one or more processors; and
memory storing processor-executable instructions that, when executed by the one or more processors, cause the first computing device to:
  determine an estimated distance to a second computing device associated with a first wireless network;
  determine, based on the estimated distance, a reduced power level associated with a second wireless network; and
  cause transmission of one or more signals, associated with the second wireless network, at the reduced power level.

9. The first computing device of claim 8, wherein the first computing device is one of a wireless router, a gateway, or an access point.

10. The first computing device of claim 8, wherein the processor-executable instructions that, when executed by the one or more processors, cause the first computing device to cause transmission of the one or more signals at the reduced power level, cause the first computing device to cause transmission of the one or more signals at the reduced power level during a time period a communication from the second computing device is received via the first wireless network.

11. The first computing device of claim 8, wherein an amount a power level of the second wireless network is reduced increases as the estimated distance to the second computing device increases.

12. The first computing device of claim 8, wherein the first wireless network comprises one or more of a Wireless Personal Area Network (WPAN), Zigbee, Bluetooth, or Wi-Fi, and wherein the second wireless network comprises one or more of Wi-Fi, WPAN, Zigbee, or Bluetooth.

13. The first computing device of claim 12, wherein the first wireless network comprises a first communication protocol and the second wireless network comprises a second communication protocol and wherein a power level associated with the first communication protocol is lower than a second power level associated with the second communication protocol.

14. The first computing device of claim 8, wherein the processor-executable instructions that, when executed by the one or more processors, cause the first computing device to determine the reduced power level associated with the second wireless network, further cause the first computing device to determine the reduced power level associated with the second wireless network based on a quantity of other computing devices communicating via the second wireless network.

15. A system comprising:
a first computing device configured to:
  determine an estimated distance to a second computing device associated with a first wireless network;
  determine, based on the estimated distance, a reduced power level associated with a second wireless network; and
  cause transmission of one or more signals, associated with the second wireless network, at the reduced power level; and
the second computing device configured to:
  send data to the first computing device via the first wireless network.

16. The system of claim 15, wherein the first computing device is one of a wireless router, a gateway, or an access point.

17. The system of claim 15, wherein the first computing device is further configured to cause transmission of the one or more signals at the reduced power level during a time period the data from the second computing device is received via the first wireless network.

18. The system of claim 15, wherein an amount a power level of the second wireless network is reduced increases as the estimated distance to the second computing device increases.

19. The system of claim 15, wherein the first wireless network comprises one or more of a Wireless Personal Area Network (WPAN), Zigbee, Bluetooth, or Wi-Fi, and wherein the second wireless network comprises one or more of Wi-Fi, WPAN, Zigbee, or Bluetooth.

20. The system of claim 19, wherein the first wireless network comprises a first communication protocol and the second wireless network comprises a second communication protocol and wherein a power level associated with the first communication protocol is lower than a second power level associated with the second communication protocol.

21. The system of claim 15, the first computing device if further configured to determine the reduced power level associated with the second wireless network based on a quantity of other computing devices communicating via the second wireless network.

* * * * *